Nov. 26, 1963  F. S. SCHADE  3,111,776
MASKING APPARATUS FOR PROGRAM TEACHING
Filed July 19, 1961  2 Sheets-Sheet 1
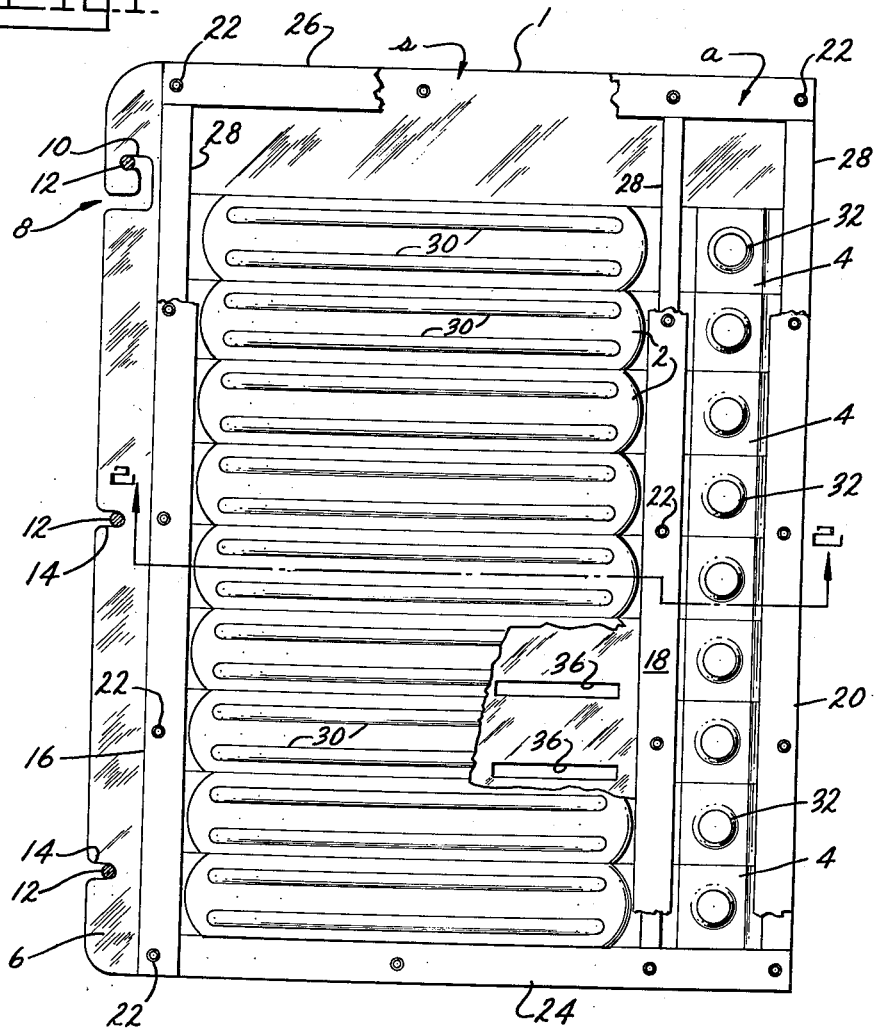
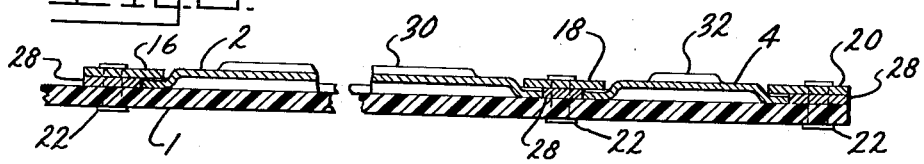
INVENTOR.
FRANK STANLEY SCHADE
BY Chapin & Neal
Attorneys

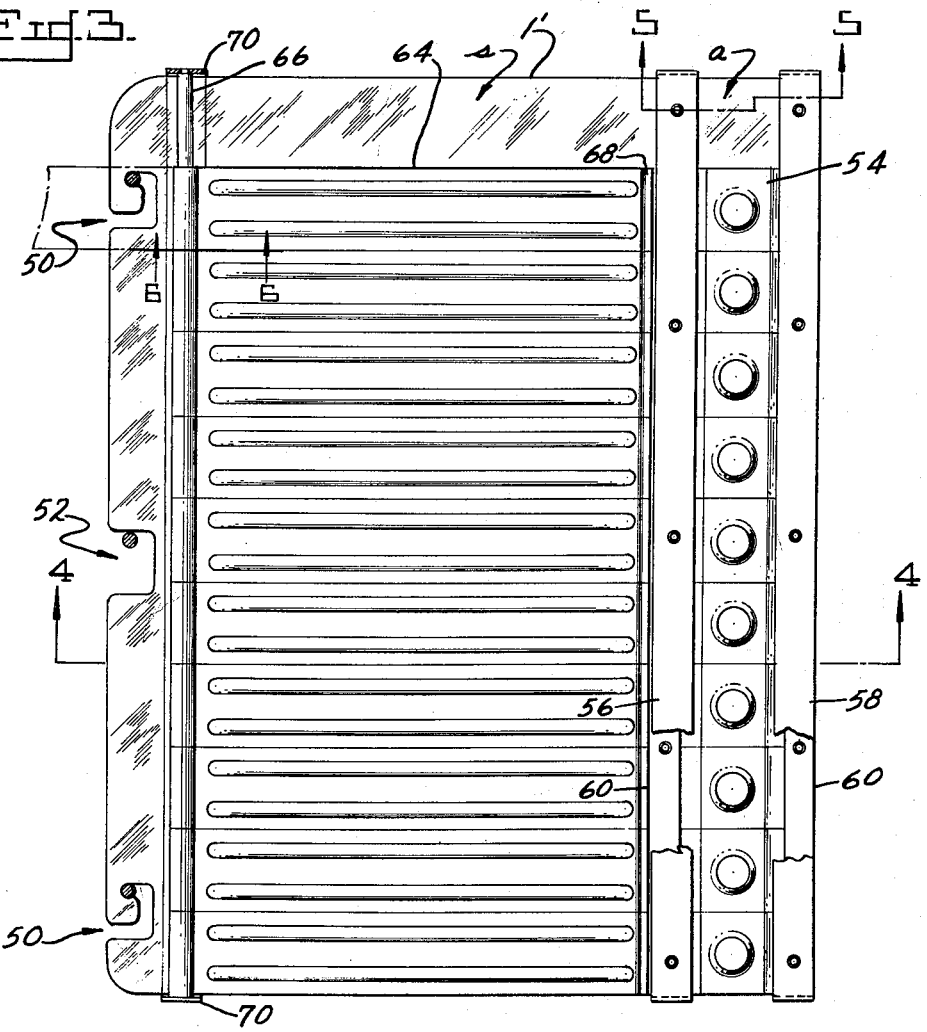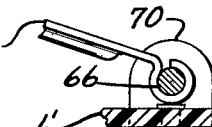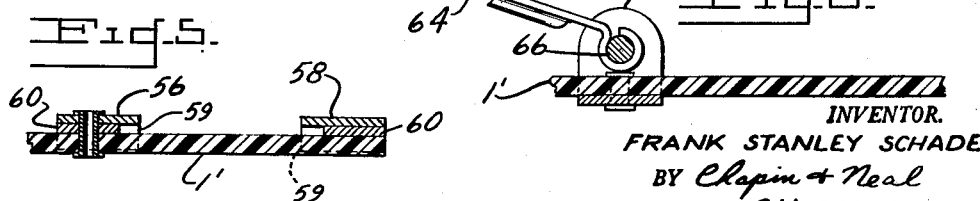

United States Patent Office 3,111,776
Patented Nov. 26, 1963

3,111,776
MASKING APPARATUS FOR PROGRAM TEACHING
Frank Stanley Schade, Holyoke, Mass., assignor to National Blank Book Company, Holyoke, Mass., a corporation of Massachusetts
Filed July 19, 1961, Ser. No. 126,854
7 Claims. (Cl. 35—9)

This invention relates to masking apparatus for viewing the individual questions and answers of a sequentially arranged series of questions printed on sheets for a "program teaching" or "program learning" system and in particular to a stiff masking panel device which may be advantageously used in conjunction with conventional loose leaf ring binders.

So-called "program teaching" or "program learning" systems have been developed in recent years and are finding increasing acceptance and usefulness in the fields of education and instruction. Such a system is prepared by breaking down a course of instruction or study into small sequential steps to be presented in consecutive question and answer form. A pupil or student takes up each individual question in a prepared sequence, first writing his own answer and then uncovering the correct answer. In this way the student can immediately determine the accuracy of an answer before he goes on, and so be prepared for the next step or question which follows.

A variety of devices have been developed for exposing questions and answers of a series for individual viewing and in order for the student to find it convenient to concentrate his attention on each single step as he goes along. Many relatively elaborate devices have been used and in some cases are characterized by mechanism for recording and answer to each question and for signalling and recording the correctness of answers.

An object of the present invention is to provide a relatively inexpensive masking device which will assist in a more widespread use of "program teaching," as in school classrooms, and in particular to enable its convenient and ready utility for classroom use by making the device adaptable to incorporation in conventional ring binder assemblies.

Another object of the invention is to provide a masking device by which each individual question of a series may be "framed" and, when an answer to the question is recorded, the correct answer may then also be exposed in "framed" fashion. The device may be used by writing the answers to questions on a sheet separate from the binder so that the particular set of programmed pages may be used over and over again, or, the device may be adapted for writing answers directly on the sheets in the usual blank spaces provided, so that a permanent record of a student's progress and achievement can be preserved.

Another object of the invention is to provide a masking device of the above described class which may be removably inserted on the rings of a loose leaf binder mechanism. Thus it may be used for any selected page of a programmed teaching course carried by the binder and without the need for opening and closing the ring mechanism.

In the art of program teaching, each question with its answer blank is commonly known as a "frame." The correct answer is printed next to the frame, and may itself be "framed." The spacing between the several questions and the particular disposition of the printed answers are usually related to specific masking apparatus which has been designed for use therewith. In some cases an answer is printed in front of a question; in orther cases it is located at the end. It may be in a side by side relation, or in a vertically offset position all as will be understood in the art.

The above and other objects and advantages of the present invention will be clear from the following description of two preferred forms thereof as shown by the accompanying drawings in which:

FIG. 1 is a top plan view with portions cut away showing an embodiment of the masking panel device of this invention;

FIG. 2 is a sectional view on line 2—2 of FIG. 1;

FIG. 3 is a view similar to FIG. 1 of a masking panel device showing an alternative form of the invention; and FIGS. 4, 5, and 6 are sectional views on lines 4—4, 5—5, and 6—6, respectively of FIG. 3.

Referring to FIG. 1 a preferred form of masking device embodying the invention is shown as a panel structure on which movable masking shutters 2 and 4 are mounted between framing strip members as will be described. It will readily be appreciated that the device is particularly designed for use with a stack of marginally punched sheets printed for a program teaching course and made up as a filler pack for a conventional loose leaf binder such as a three ring notebook.

The type of loose leaf binder and pages for it are well known and need not be shown or described in any detail. It will suffice to point out that the present device includes the panel 1 having a vertical marginal portion as indicated at 6 for mounting on wire rings. In the edge of the margin 6 are located three spaced notched portions. The top or endmost notch is indicated at 8 and is cut with a slotted entrance section, a transverse section, and a reversely directed blind-end section as at 10. The panel 1 may thus be manipulated to pass the upper ring of the usual binder mechanism through the slot 8 and brought to rest in pocketed fashion as indicated by the wire ring section 12. Then, as will be appreciated, the panel may be swung on the top ring 12 to bring the two simple notches at 14 to register with the two lower ring wires 12. The panel is thus effectively lodged against shifting from its position on the rings unless intentionally handled in a reverse fashion to remove and mount it for use with a succeeding page of the notebook.

Panel 1 comprises a stiff sheet of transparent plastic material through which the printed matter on an underlying notebook page may be read. The movable masking shutters 2 and 4 are manipulated by a user to unmask each question of the programmed material, study it, write an answer, and then unmask the correct answer to compare it with the written answer. In accordance with the programmed teaching system the student keeps each answer concealed until he is ready for it.

This procedure for each question is repeated, proceeding downwardly on a programmed page after which the student may then remove the panel from the rings, rearranging the shutters to start again; slide it under the finished page so as to conceal the material of the next page; turn the finished page on the rings; and again mount the panel on the rings and continue as outlined with the succeeding page.

The masking shutters 2 and 4 are vertically arranged in adjacent columns on the panel, the shutters 2 collectively masking most of the underlying area in the column indicated by the arrow *s* and the shutters 4 correspondingly masking the column designated by the arrow *a*. The vertical dimensions of each series of shutters 2 and 4 are preferably identical. The shutters as shown in each series are vertically juxtaposed, the facing top and bottom edges of adjacent shutters being in abutment when brought together. In FIG. 1 the shutters are arranged ready for initial use and it will be seen that the uncovered area of the transparent panel 1 at the top of each column of shutters corresponds in size to the area which is covered by an individual shutter arranged in each column.

The shutters are slidable on the panel surface, the end edges being tucked under and slidable beneath the overhanging edges of frame edge members 16, 18, and 20. These members are metallic strip framing elements the inner strip 16 defining the inner edge of the marginal area 6 and the inner margin of the masked area of column s. Between strip 16 and the outer side margin 20 of the panel is the intermediate strip 18 which divides the panel surface into the two columnar areas, the columnar a being a narrow answer column. The strip members are parallel and suitably fixed to the panel as by the rivets indicated at 22. At the top and bottom of the columns are top and bottom edge strips 24 and 26 providing stops against which the endmost shutters 2 and 4 may be shifted to limit travel of the shutters endwise of the columns.

Details of the strip members and shutters are shown by FIGS. 1 and 2. The strip members 16, 18, and 20 are preferably of two piece construction. A lower strip portion at 28 underlies each strip 16 and 20 to provide the inwardly directed overhanging edges as shown by FIG. 2.

The strip portion 28 underlying strip 18 is centrally disposed to provide the overhanging edges for the adjacent edges of columns s and a. The riveting at 22 holds the strip assembly on the panel.

As shown by FIG. 2 the masking shutters 2 and 4 both are formed with thin end edges slidably held under the strip edge portions overlying the panel surface, the body of the shutters between the strips being upwardly bent to overlie the panel surface in spaced relation. Thus, marring or scoring of the panel surface is avoided. For convenient manipulation of the shutters 2 the parallel upwardly offset ribs 30 are struck from the plane thereof and enable the user to slide each shutter as desired. For the same purpose the upwardly offset circular portions 32 are formed in the shutters 4 and provide convenient thumb or finger engaging knobs by which these shutters can be shifted up and down between the tracking strips of the column.

It will now be evident that in using the device the series of questions and answers beginning at the top and in descending order are unmasked in sequence by sliding the shutter 2 of column s upwardly, recording the user's answer, unmasking the horizontally adjacent shutter 4 of the column a to check the correct answer; and then proceeding in the same manner to the next lower question and answer "frame." As shown the device is provided with nine question "frames." A greater or lesser number may be provided in any given device. The number and particular dimensions of individual shutters would be selected to suit the programmed subject matter with which the device is intended for use. Where numerals or short formulae constitute the written material, a greater number of frames may be used. In some instances where the material requires more space three or four shutters per column might be in order.

In FIG. 1 the cut away portion of the shutters 2 show access openings or windows at 36. Such rectangular windows are preferably formed in the panel in each "frame" at a desired location to overlie a blank of the written text for each frame. The user's answer may thus be written directly on the programmed page through the opening and a record of a more or less permanent nature can be had. Alternatively, the user may write answers on a separate sheet so that the same set of program pages may be repeatedly used by a number of students.

An alternative form of the masking panel apparatus embodying the invention is shown by FIGS. 3 to 6. In this form the transparent panel 1' of stiff plastic material has in the edge of the inner marginal portion a pair of reversely formed slots 50 at the top and bottom, each similar in form to the locking slot 8 in FIG. 1. The wide central notch 52 provides clearance for the middle ring of a three ring binder when shifting the panel to place the top and bottom ring wires in the slots 50.

The dimensions of the columnar areas s and a are similar to those of the FIG. 1 device, the shutters 54 of column a being identical with shutters 4 previously described. Strip members 56 and 58 bordering column a are formed by underlying strip portions 60 and inwardly facing overhanging edges to slidably retain the shutters in the same manner as in FIG. 1. Strips 56 and 58 at the top and bottom panel edges (FIG. 5) are turned down against the edges as at 59. In this manner stops are formed at the top and bottom of column a against which the end edges of the endmost shutters 54 may be moved.

Overlying column s of this form of the device are a plurality of masking shutters 64 pivoted on a vertical hinge pin at 66. The pin 66 defines the inner margin of the column s and is mounted between the upturned ends 70 of a strip member 72 fixed preferably at the underside of the panel by rivets as at 74 (FIG. 4). The shutters 64 are vertically slidable for shifting on the pin and at their outer ends are downwardly offset as at 68 adjacent the strip 56 to ride on the panel surface. These shutters (FIG. 6) may be turned away from the panel surface of the column s at the user's option. Thus, they may be either shifted upwardly to uncover each "frame" in sequence and cover the finished "frames" in the same manner as described in using the FIG. 1 device, or, if desired, they may be pivoted in sequence so as to leave all the finished "frames" exposed to view as the student proceeds. It will be seen that if shutters 64 are all turned on the pin there is no need for vertical shifting. The upwardly offset position of the shutter body enables an easy finger engagement for lifting pivotal action.

Having thus described the invention, what is claimed as novel and desired to be secured by Letters Patent of the United States is:

1. A masking device for viewing individual questions and answers of a "framed" program teaching page, said device comprising a flat panel of stiff transparent material, a frame edge member at opposite side margins of the panel and a frame edge member in an intermediate position between the sides, said members being parallel and defining fixed lateral edges of adjacent columnar areas on said panel, a plurality of juxtaposed masking members extending transversely across each columnar area and each masking member being slidably held by at least one of said fixed column defining frame members, stop means at the ends of each columnar area engageable by the endmost masking members thereof and limiting travel of masking members endwise of the columns, each column having an unmasked area corresponding in size to the area covered by a single masking member of the column.

2. A masking panel device for framed viewing of questions and answers on a "program teaching" sheet having spaced questions and answers arranged in sequence in separated laterally adjacent columnar areas of said sheet, said panel device comprising a flat sheet of stiff transparent material, an inner and outer marginal strip frame member extending vertically of the sheet at opposite side edges thereof and a vertical intermediate strip frame member dividing the sheet into two adjacent columnar viewing areas, a plurality of vertically arranged masking shutter members extending transversely between the intermediate strip and the inner and outer strips, respectively, and masking the underlying area of the transparent panel of each column, each column having an unmasked area corresponding in size to the area covered by a single shutter, said shutter members being movable vertically between said strip members and slidably engaging the strip members for each column, abutment means at the top and at the bottom of said strip members limiting vertical travel of the endmost shutters, each shutter member being engageable in edge to edge juxtaposed relation with an adjacent shutter of each column and movable therefrom a maximum distance approximating the vertical dimension of a single shutter.

3. The structure of claim 2 in which the transparent panel extends inwardly of the inner marginal strip member and provides a marginal area for attachment on the rings of a binder mechanism, the edge of said marginal area having spaced notched portions for receiving rings and at least one of said notched portions being formed with a slot having a blind end offset from the entrance thereto.

4. The structure of claim 2 in which the edges of the strip members defining the vertical margins of the said columnar areas overlie the panel surface and marginal edge portions of each shutter member are slidably received thereunder, the plane of each shutter body overlying the columnar area being upwardly offset from the panel top surface.

5. The structure of claim 2 in which one of said columnar areas is relatively narrow and elongated in shape and disposed along the outer edge portion of said panel and the shutter members overlying the other of the columnar areas are hingedly connected to the inner marginal frame member and may be pivoted away from the overlying relation against the panel.

6. A masking device for individually viewing questions and answers on "framed" program teaching pages bound in a loose leaf ring binder apparatus, said device comprising a flat panel of stiff transparent material having an inner marginal portion provided with vertically spaced ring receiving notched portions in the edge thereof, an endmost notched portion having a reversely turned blind ring holding slot, a vertical strip member fixed on the panel surface and bordering the edge of said marginal portion, strip members along the outer panel edge and at the top and bottom edges, and an intermediate vertical strip spaced inwardly of said outer edge member, the vertical strip members having marginal edge portions overlying the panel surface and defining the sides of adjacent columnar areas on said panel, a plurality of equally dimensioned vertically arranged masking shutter members extending transversely across each column, the overlying edges of the vertical strips retaining the end edges of said shutters and providing a sliding track therefor, and the plane of the shutters between the edges being raised to overlie the panel surface in spaced relation and having upwardly offset body portions forming finger-engaging means for slidably manipulating the shutter, the unmasked portion of each columnar area having a size corresponding to the size of a single shutter in the column, said strips at the top and bottom panel edges forming abutment means for limiting endwise travel of the shutters in each column.

7. A masking device for individually viewing questions and answers on "framed" program teaching pages bound in a loose leaf ring binder apparatus, said device comprising a flat panel of stiff transparent material having an inner marginal portion provided with vertically spaced ring receiving notched portions in the edge thereof, the endmost notched portion having a reversely turned blind ring holding slot, a vertical strip fixed to the panel having upturned ends at the top and bottom edges and a hinge pin mounted between said ends closely overlying the panel and bordering the edge of said marginal portion, a vertical strip member along the outer edge of the panel and an intermediate strip member mounted in inwardly spaced relation to said edge, said latter strip members having portions overlying the panel surface along the opposing edges thereof, said pin and said strips defining adjacent columnar areas on said panel, vertically arranged masking shutter members of equal dimension between said overlying edges of the strips and having the end edges of the shutters retained thereby for vertical sliding movement, and a plurality of equally dimensioned shutter members slidably and pivotally mounted on said pin in vertical juxtaposition, said latter shutters each being swingable to and from an overlying position on the panel and extending transversely in the latter position to the edge of the said intermediate strip member, the uncovered portion of each columnar area being of a size corresponding to that of a single shutter member, said upturned ends of the first strip member providing stops for endwise movement of the pivotable shutters, and stop means at the top and bottom of the panel to limit travel of the other shutter members.

References Cited in the file of this patent
UNITED STATES PATENTS

| 2,234,075 | Carolin | Mar. 4, 1941 |
| 2,645,041 | Merrill | July 14, 1953 |

FOREIGN PATENTS

| 24,054 | Great Britain | Dec. 16, 1895 |
| 824,031 | France | Nov. 3, 1937 |
| 825,342 | France | Dec. 8, 1937 |